US009548635B2

(12) United States Patent
Schuler et al.

(10) Patent No.: US 9,548,635 B2
(45) Date of Patent: Jan. 17, 2017

(54) THRUST WASHER FOR AN ELECTRIC MACHINE

(75) Inventors: Dieter Schuler, Buehl (DE); Wolfgang Winkler, Schutterwald (DE); Gerald Kuenzel, Lichtenau (DE); Lena Behelfer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 302 days.

(21) Appl. No.: 14/118,456

(22) PCT Filed: Mar. 20, 2012

(86) PCT No.: PCT/EP2012/054908
§ 371 (c)(1),
(2), (4) Date: Nov. 18, 2013

(87) PCT Pub. No.: WO2012/156133
PCT Pub. Date: Nov. 22, 2012

(65) Prior Publication Data
US 2014/0084723 A1    Mar. 27, 2014

(30) Foreign Application Priority Data
May 18, 2011   (DE) .......... 10-2011 076 081

(51) Int. Cl.
*H02K 5/16*    (2006.01)
*H02K 5/24*    (2006.01)
(Continued)

(52) U.S. Cl.
CPC .......... *H02K 5/16* (2013.01); *F16C 1/108* (2013.01); *F16C 27/00* (2013.01); *F16C 27/06* (2013.01);
(Continued)

(58) Field of Classification Search
CPC .......... H02K 5/00; H02K 5/161; H02K 5/163; H02K 5/165; H02K 5/167; H02K 5/1672; H02K 5/1675; H02K 5/1677; H02K 5/16; H02K 5/24; H02K 5/124; H02K 13/00; F16C 33/122; F16C 1/108; F16C 27/00; F16C 27/08; F16C 33/22; F16C 33/24; F16C 11/083; F16C 17/042; F16C 17/047
(Continued)

(56) References Cited

U.S. PATENT DOCUMENTS 3,573,510 A *   4/1971   Otto .............. F16C 17/04
                                                   384/412
5,683,184 A *   11/1997  Striedacher ...... F16C 23/04
                                                   384/138
(Continued)

FOREIGN PATENT DOCUMENTS

CN        1428916        7/2003
DE     102004044340      3/2006
(Continued)

OTHER PUBLICATIONS

Stohling Marco; Bauer Karl-Heinz; Rub Michael; Wittstadt Frank; Diller Hannelore; Tiemeyer Peter, Electro-Motor Drive in Particular Fan Drive, Jul. 8, 2010, Brose Fahrzeugteile GMBH & Co., WO2010/075844.*
(Continued)

*Primary Examiner* — Joshua Benitez-Rosario
*Assistant Examiner* — Alexander Singh
(74) *Attorney, Agent, or Firm* — Michael Best & Friedrich LLP

(57) ABSTRACT

The invention relates to a thrust washer (28) for an electric machine (10, 12) intended to be arranged on a shaft (16) between a bearing (18) and a rotor (14), preferably a rotating electrical contact element (24) impacted by brushes (38), and/or a disk pack (36) of the rotor (14). The thrust washer
(Continued)

(28) is provided with an area for sealing having two end faces (32, 34). On each end face (32, 34), at least one radial abutment section (50, 52) for the bearing (18), or the rotor (14), is provided. The thrust washer (28) according to the invention is characterized in that it is made of at least one hard component (54) and one soft component (56), wherein the part of the radial abutment section (50, 52) abutting the rotor (14) and/or the bearing (18) is formed by the soft component (56).

18 Claims, 2 Drawing Sheets

(51) Int. Cl.
  *F16C 33/22*   (2006.01)
  *F16C 27/06*   (2006.01)
  *F16C 27/00*   (2006.01)
  *F16C 1/10*    (2006.01)
  *H02K 5/167*   (2006.01)

(52) U.S. Cl.
  CPC ............. *F16C 33/22* (2013.01); *H02K 5/1672* (2013.01); *H02K 5/24* (2013.01)

(58) Field of Classification Search
  USPC ....... 310/45, 89, 87, 239, 90, 242, 248, 251, 310/238, 91, 42, 43; 384/192, 195, 384/202, 210, 206, 107, 112, 121, 420, 384/303, 243, 223
  See application file for complete search history.

(56) References Cited

U.S. PATENT DOCUMENTS

| | | | |
|---|---|---|---|
| 5,917,258 A * | 6/1999 | Kershaw | H02K 5/1672 310/43 |
| 6,707,177 B1 | 3/2004 | Campbell et al. | |
| 8,421,283 B2 * | 4/2013 | Stoehling | H02K 5/24 277/916 |

FOREIGN PATENT DOCUMENTS

| | | | | |
|---|---|---|---|---|
| DE | 102008062432 | | 7/2010 | |
| EP | 0698956 | | 2/1996 | |
| WO | WO 2010075844 A2 * | | 7/2010 | ............... H02K 5/24 |

OTHER PUBLICATIONS

International Search Report for Application No. PCT/EP2012/054908 dated Feb. 5, 2013 (3 pages).

"Hytrel—thermoplastic polyester elastomer. Injection Molding Guide," DuPont, Jan. 1, 2000, pp. 1-37, XP055051472, retrieved from the Internet on Jan. 28, 2013 <URL: http://www2.dupont.com/Plastics/en_US/assets/downloads/processing/H81091.pdf> p. 18.

* cited by examiner

THRUST WASHER FOR AN ELECTRIC MACHINE

BACKGROUND OF THE INVENTION

The invention relates to a thrust washer for an electric machine for arranging on a shaft between a bearing and a rotor, preferably a rotating electric contact element, which is influenced by brushes, or rather a laminate stack of the rotor, wherein the thrust washer comprises a region for providing a sealing arrangement with two end faces, and at least one radial contacting section for the bearing and the rotor respectively is provided on each end face. A thrust washer of this type for an electric machine can be arranged on a shaft between a bearing and a rotor, in particular between a rotating electrical contact element, which is influenced by brushes, or rather a laminate stack of the rotor. The thrust washer comprises a region for providing a sealing arrangement with two end faces and has on each end face at least one contacting section for the bearing and/or the rotor.

Electric motors such as those generally used for heating and air-conditioning motors are required to fulfill stringent requirements with regard to noise. The noise level of said electric motors is greatly influenced by the so-called longitudinal oscillation of the armature that is excited by way of the longitudinal play of generally a few one-tenth millimeters that occurs in the electric motor during operation. So-called thrust washers are located in the electric motor and are arranged between the non-moving bush bearings and the rotating armature or rotor and said thrust washers by virtue of their material characteristics such as wear-resistance, surface, serviceable life etc.—reduce the friction. As a result of the likewise high requirements for a long serviceable life, in other words good wear resistance, the material, generally an elastic synthetic material, for example polyester elastomer, has a comparatively small amount of intrinsic elasticity. It is also known to install corrugated washers or corrugated rings. However, corrugated washers or corrugated rings only function when in contact between the non-moving parts and the rotating parts.

It is possible by means of skillful selection of the elasticity and damping of the thrust washer to modify the excitation of the axial oscillation to such an extent that said axial oscillation is damped during operation and thus does not cause any noise production. DE 10 2004 044 340 A1 discloses for example a thrust washer of the type mentioned above for an electric machine, in which the contacting sections of the two end faces are mutually connected by way of resilient sections that are embodied on the thrust washer.

SUMMARY OF THE INVENTION

The object of the invention is to provide a thrust washer for an electric machine that further improves the damping of the longitudinal oscillation of the armature with respect to existing thrust washers in conjunction with a cost reduction and further reduces the noise production.

The thrust washer in accordance with the invention for an electric machine has the advantage that the damping of the longitudinal oscillation of the armature can be improved in conjunction with reducing the noise production without using additional parts (for example corrugated rings). In addition, the wear resistance is increased and the machine construction is simple. For this purpose, the thrust washer is embodied in an inventive manner from at least one hard component and at least one soft component, wherein the part of the radial contacting section that lies on the rotor and/or bearing of the electric machine is embodied by the soft component. High axial forces can be absorbed in this manner during operation by way of the hard component, whereas the soft component acts against the longitudinal oscillation of the armature and prevents a corresponding excitation.

In addition, it is provided that the contacting section comprises at least two planes that are spaced apart in the axial direction of the shaft, wherein a first plane is formed by the part of the contacting section that lies on the bearing or rotor and at least a second plane is arranged between the first plane and the returning region, wherein the second plane is embodied from both the soft component and the hard component. By virtue of this arrangement the force is introduced over an elastic region—namely the first plane that is embodied as the soft component—and the damping behavior is further improved. The hard component of the second plane effectively prevents the soft component of the first plane from being damaged in the case of high axial forces. For this purpose, the soft component and the hard component are arranged in an advantageous manner between the first plane and a region for returning lubrication means in the axial direction of the shaft on the same second plane. As an alternative thereto, the soft component and the hard component between the first plane and the region for returning the lubrication means in the axial direction of the shaft are however also spaced apart from each other in such a manner that the hard component extends further in the direction of the first plane than the soft component, nonetheless it remains below the level of the first plane. In this manner, it is possible to provide a defined stop in the axial direction until damping by means of the soft component is ensured.

In order to avoid having to provide an additional sealing function with respect to oil penetrating from the bearing in the direction of the rotor, in particular the commutator, the soft component is in an advantageous manner embodied in a circumferential manner at its inner diameter, preferably over the entire axial extension of its shaft-side contacting region between the two radial contacting regions.

In an advantageous embodiment of the invention the hard component and the soft component are embodied from the same material, for example Hytrel. Consequently, the thrust washer can be embodied as one piece, wherein the hardness (quoted in Shore D) of the hard component and of the soft component differ by at least Shore D=5. The axial rigidity is clearly reduced in this manner and consequently a damping process is possible in the axial direction for example by using two Hytrel materials (or corresponding materials that have comparable intrinsic damping, abrasion hardness and temperature stability).

BRIEF DESCRIPTION OF THE DRAWINGS

The invention is explained by way of example hereinunder with reference to FIGS. 1 and 2, wherein like reference numerals in the figures indicate like components that have like functions. The figures in the drawing, the description of the figures and the claims comprise numerous features in combination. A person skilled in the art will also consider these features individually and combine said features to form further expedient combinations. In particular, a person skilled in the art will also combine the features of different exemplary embodiments to form further expedient combinations.

In the drawing.

DETAILED DESCRIPTION

Figure 1:
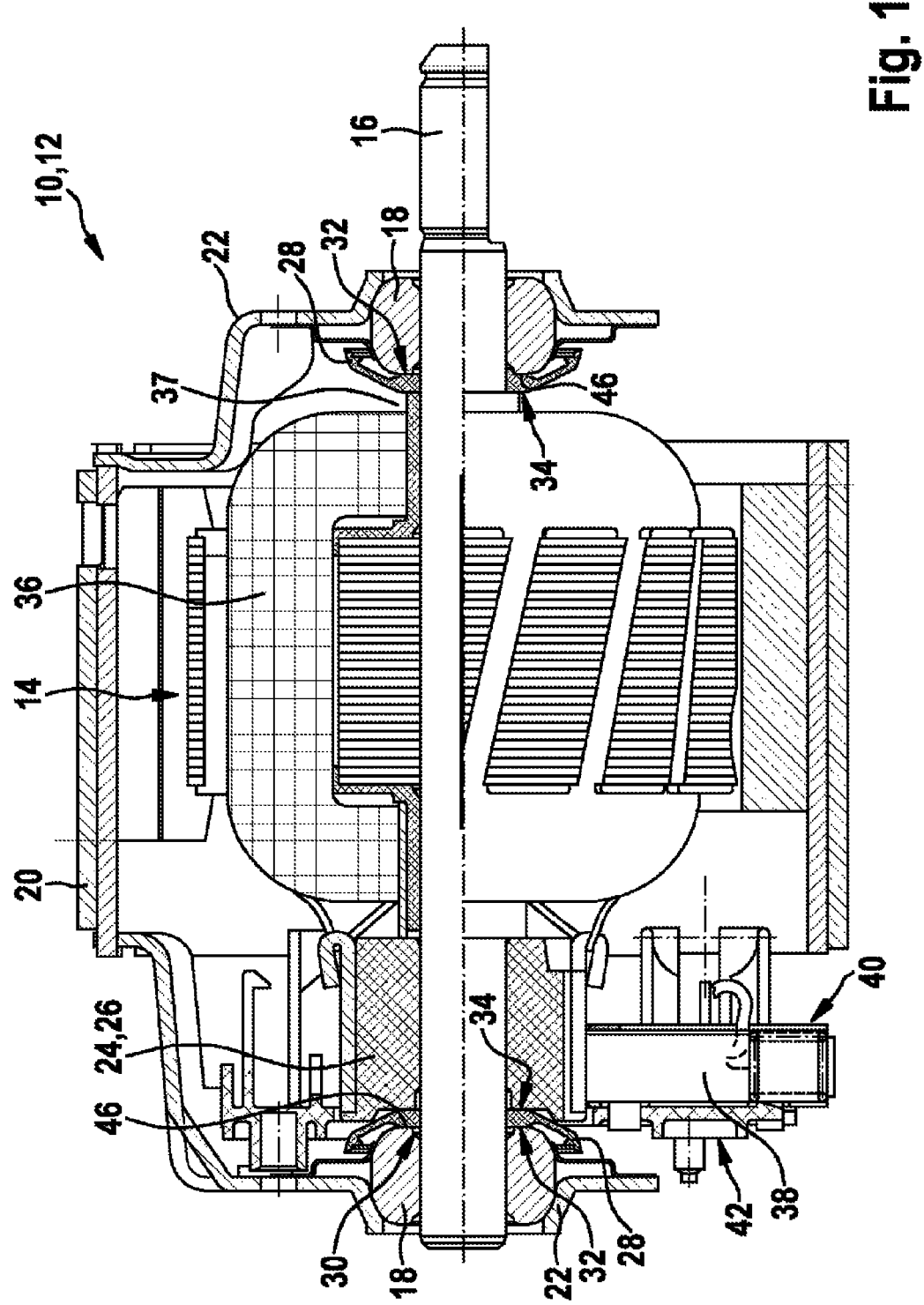
FIG. 1 illustrates a longitudinal sectional view of an electric machine according to the prior art and FIG. 2 illustrates a perspective view of a thrust washer in accordance with the invention.

A part of a rotating electric machine 10 according to the prior art is illustrated in a simplified manner in a longitudinal sectional view in FIG. 1. The electric machine 10 is an electromotor 12 that is used in a motor vehicle for example in a window lifter, a wiper drive, preferably a heater and blower drive etc. However, it can also be a generator.

The electromotor 12 comprises a wound rotor 14 that is arranged on a shaft 16. The shaft 16 is mounted with two bearings 18. The bearings 18 in the present exemplary embodiment are sintered cup and ball bearings or rather bush bearings that are saturated with oil. However, other bearings 18, such as ball bearings or similar can also be used. The bearings 18 are in each case arranged in end plates 22 that are located on the two end faces of a housing 20 of the electromotor 12.

A thrust washer 28 having a receiving bore 30 for the shaft 16 is arranged between one of the bearings 18 and a commutator 26 that is used as an electric contact element 24, wherein the thrust washer 28 preferably lies with its first end face 32 on the bearing 18 and with its second end face 34 on the commutator 26 and preferably has a press-fit on the shaft 16. A sealing arrangement is created on the shaft 16 by means of the press-fit. A further thrust washer 28 is arranged between the other bearing 18 and the rotor 14 or rather a laminated core 36 or the collar 37 of an insulating laminate disk of the laminate stack 36. However, this further thrust washer can also be omitted or a differently formed thrust washer can be provided. The rotor is supported in the axial direction of the shaft 16 on the bearings 18 by way of the one thrust washer 28 or the two thrust washers 28.

It is also possible in place of the commutator 26 to provide a collector of the generator as an electric contact element 24. In both cases, the electric contact elements 24 are contacted by way of brushes 38 that are guided in brush holders 40, wherein the brush holders 40 are fastened to a brush carrier 42 of the electric machine 10 by way of fastening brackets.

Figure 2:
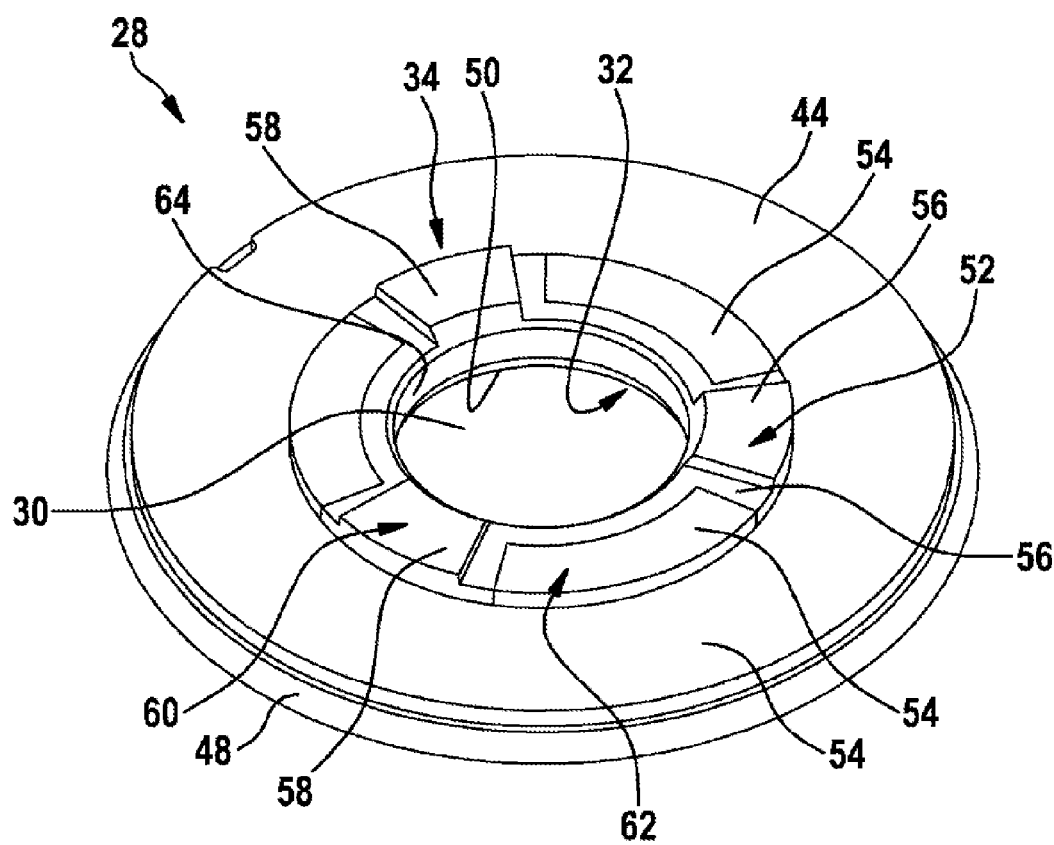

FIG. 2 illustrates an enlarged view of the thrust washer 28 in accordance with the invention. Said thrust washer comprises a region 44 for returning the lubrication means to the bearing 18. For this purpose, the thrust washer 28 extends in an annular manner over the end face 46 of the bearing 18 (cf. also FIG. 1 regarding this), which end face faces the thrust washer. The thrust washer comprises on the outer rim an axially protruding edge 48 for the purpose of returning the lubricating means, for example oil, to the bearing 18. In addition, the edge 48 acts as a protection for the commutator 26 against the lubricating means. The annular region 44 can alternatively also be embodied in a conical or arched manner, and—as illustrated in FIG. 1—can extend in the shape of a hood over the bearing 18 in order to influence the return flow of the oil. Likewise, the thrust washer 28 can comprise further axial circumferential protrusions on the side of the annular region 44, which side faces the bearing 18, for the purpose of returning the lubricating means, but these will not be described here in detail. It is essential that a sealing region is provided which seals the rotor 14, in particular the commutator 26, from any possible oil flow from the bearing 18.

A radial contacting section 50 for the bearing 18 is embodied on the first end face 32 of the thrust washer 28 and a radial contacting section 52 for the rotor 14 is embodied on the second end face 34. The rotor 14 or rather armature can contact the contacting section 52 directly or by means of the commutator 26. It is provided in accordance with the invention that the thrust washer 28 is embodied from at least one hard component 54 and a soft component 56, wherein the part of the contacting section 52 that is lying on the rotor 14 is embodied by the soft component 56. This part is furthermore divided into individual circle segments 58 for the purpose of contacting the rotor 14.

The contact section 52 comprises two planes 60 and 62 that are spaced apart in the axial direction of the shaft 16, wherein the first plane 60 is embodied by the circle segments 58 of the contacting section 52, which circle segments lie on the rotor 14. The second plane 62 is arranged between the first plane 60 and the region 44 for returning the lubricating means and is embodied from both the soft component 56 and the hard component 54, whereas the region 44 for returning the lubricating means is embodied solely by the hard component 54. By virtue of this arrangement the force is introduced over an elastic region—namely the first plane 60 that is embodied as the soft component 56—and the damping behavior is further improved. The hard component 54 of the second plane 62 effectively prevents the soft component 56 of the first plane 60 from being damaged in the case of high axial forces.

It is evident in FIG. 2 that the hard component 54 and the soft component 56 of the second plane 62 are arranged in the axial direction on the same level. However, as an alternative thereto, the two components 54, 56 can also be spaced apart from each other in the axial direction of the shaft 16 in such a manner that the hard component 54 extends further in the direction of the first plane 60 than the soft component 56, nonetheless it remains below the level of the first plane 60. In this manner, it is possible to achieve a defined stop in the axial direction until the damping by means of the soft component 56 is ensured.

In order to avoid having to provide an additional sealing function with respect to oil penetrating from the bearing 18 in the direction of the rotor 14, in particular in the direction of the commutator 26, the soft component 56 is in an advantageous manner embodied in a circumferential manner at its inner diameter, over the entire axial extension of its shaft-side contacting region 64 between the two radial contacting regions 50, 52.

It is particularly advantageous if the hard component 54 and the soft component 56 are embodied from the same material, for example Hytrel. In this manner, the thrust washer 28 can be embodied as one piece, wherein the hardness (quoted in Shore D) of the hard component 54 and of the soft component 56 differ by at least Shore D=5. The axial rigidity is clearly reduced in this manner and consequently a damping process is possible in the axial direction by using two Hytrel materials, for example Hytrel 5555 HS (Shore D=55+/−2) with a 2K contour of Hytrel 4056 TPC-ET (Shore D max=40) or corresponding materials that have comparable intrinsic damping properties, abrasion resistance and temperature stability.

Reference is finally made to the fact that the illustrated exemplary embodiment is not limited to FIGS. 1 and 2 but rather that application geometries and arrangements that differ therefrom are also feasible within the electric machine 10. In addition, the dimensional ratios illustrated in the figures between the thrust washers 28 in accordance with the invention and the remaining components of the electric machine 10, in particular the bearings 18 and the rotor 14, do not as such have any influence on the invention. The same applies for the shape and size of the circle segments 58 of the first plane 60 and also of the hard component 54 and the soft component 56 of the second plane 62 of the second contacting region 52. It is further mentioned that as an alternative thereto or supplementary thereto the first contacting region 50 can also be embodied in the structural design of the second contacting region 52.

The invention claimed is:

1. A thrust washer (28) for an electric machine (10) for arranging on a shaft (16) between a bearing (18) and a rotor (14), wherein the thrust washer (28) comprises a region for providing a sealing arrangement with two end faces (32, 34), and at least one radial contacting section (50, 52) for the bearing (18) and the rotor (14) respectively is provided on each end face (32, 34), characterized in that the thrust washer (28) is embodied from at least a hard component (54) and a soft component (56), wherein a part of the radial contacting section (50, 52) that is lying on at least one of the rotor (14) and the bearing (18) is embodied by the soft component (56), wherein the radial contacting section (50, 52) comprises at least first and second planes (60, 62) that are spaced apart in an axial direction of the shaft (16), wherein the second plane (62) is arranged between the first plane (60) and a region (44) for returning lubricating means, wherein the second plane (62) is embodied from both the soft component (56) and the hard component (54), and wherein the soft component (56) and the hard component (54) between the first plane (60) and the region (44) for returning the lubricating means in the axial direction of the shaft (16) are spaced apart from each other in such a manner that the hard component (54) extends further in a direction of the first plane (60) than the soft component (56) but remains below a level of the first plane (60).

2. The thrust washer (28) as claimed in claim 1, characterized in that the region (44) for returning the lubricating means is embodied solely from the hard component (54).

3. The thrust washer (28) as claimed in claim 1, characterized in that the soft component (56) and the hard component (54) are arranged between the first plane (60) and the region (44) for returning the lubricating means in the axial direction of the shaft (16) on the same second plane (62).

4. The thrust washer (28) as claimed in claim 1, characterized in that the soft component (56) is embodied in a circumferential manner at an inner diameter of the soft component.

5. The thrust washer (28) as claimed in claim 1, characterized in that the hard component (54) and the soft component (56) are embodied from the same material.

6. The thrust washer (28) as claimed in claim 5, characterized in that the thrust washer (28) is embodied as one piece.

7. The thrust washer (28) as claimed in claim 1, characterized in that a hardness of the hard component (54) and of the soft component (56) differ by at least Shore D=5.

8. The thrust washer (28) as claimed in claim 1, characterized in that the soft component (56) is embodied in a circumferential manner over an entire axial extension of a shaft-side contacting region (64) between the radial contacting regions (50, 52).

9. An electric machine (10) comprising a shaft (16) between a bearing (18) and a rotor (14), and a thrust washer (28) including a region for providing a sealing arrangement with two end faces (32, 34), and at least one radial contacting section (50, 52) for the bearing (18) and the rotor (14) respectively is provided on each end face (32, 34), characterized in that the thrust washer (28) is embodied from at least a hard component (54) and a soft component (56), wherein a part of the radial contacting section (50, 52) that is lying on at least one of the rotor (14) and the bearing (18) is embodied by the soft component (56), wherein the radial contacting section (50, 52) comprises at least first and second planes (60, 62) that are spaced apart in an axial direction of the shaft (16), wherein the second plane (62) is arranged between the first plane (60) and a region (44) for returning lubricating means, wherein the second plane (62) is embodied from both the soft component (56) and the hard component (54), and wherein the soft component (56) and the hard component (54) between the first plane (60) and the region (44) for returning the lubricating means in the axial direction of the shaft (16) are spaced apart from each other in such a manner that the hard component (54) extends further in a direction of the first plane (60) than the soft component (56) but remains below a level of the first plane (60).

10. The electric machine as claimed in claim 9, characterized in that the region (44) for returning the lubricating means is embodied solely from the hard component (54).

11. The electric machine as claimed in claim 9, characterized in that the soft component (56) and the hard component (54) are arranged between the first plane (60) and the region (44) for returning the lubricating means in the axial direction of the shaft (16) on the same second plane (62).

12. The electric machine as claimed in claim 9, characterized in that the soft component (56) is embodied in a circumferential manner at an inner diameter of the soft component.

13. The electric machine as claimed in claim 9, characterized in that the hard component (54) and the soft component (56) are embodied from the same material.

14. The electric machine as claimed in claim 13, characterized in that the thrust washer (28) is embodied as one piece.

15. The electric machine as claimed in claim 9, characterized in that a hardness of the hard component (54) and of the soft component (56) differ by at least Shore D=5.

16. The electric machine as claimed in claim 9 wherein the thrust washer is between a bearing (18) and a rotating electric contact element (24), which is influenced by brushes (38).

17. The electric machine as claimed in claim 9 wherein the thrust washer is between a bearing (18) and a laminate stack (36) of the rotor.

18. The electric machine as claimed in claim 9, characterized in that the soft component (56) is embodied in a circumferential manner over an entire axial extension of a shaft-side contacting region (64) between the radial contacting regions (50, 52).

* * * * *